United States Patent
Li et al.

(10) Patent No.: US 11,095,202 B1
(45) Date of Patent: Aug. 17, 2021

(54) METHOD AND APPARATUS FOR COMMON-MODE VOLTAGE CANCELLATION

(71) Applicant: GE Aviation Systems LLC, Grand Rapids, MI (US)

(72) Inventors: Cong Li, Schenectady, NY (US); Michael J. Schutten, Rotterdam, NY (US); Di Pan, Schenectady, NY (US); Ren Xie, Schenectady, NY (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 16/902,920

(22) Filed: Jun. 16, 2020

(51) Int. Cl.
*H02M 1/12* (2006.01)
*H02M 7/48* (2007.01)
*H02M 1/44* (2007.01)

(52) U.S. Cl.
CPC ............... *H02M 1/12* (2013.01); *H02M 1/44* (2013.01); *H02M 7/48* (2013.01); *H02M 2001/123* (2013.01)

(58) Field of Classification Search
None
See application file for complete search history.

(56) References Cited

U.S. PATENT DOCUMENTS

| | | | |
|---|---|---|---|
| 6,208,098 B1* | 3/2001 | Kume | H02M 1/126 318/400.25 |
| 6,850,423 B2 | 2/2005 | Lanni | |
| 9,172,296 B2 | 10/2015 | Seymour et al. | |
| 9,270,159 B2 | 2/2016 | Shen et al. | |
| 9,425,686 B2 | 8/2016 | Zheng et al. | |
| 9,455,646 B2* | 9/2016 | Zhou | H02M 1/12 |
| 9,559,581 B2 | 1/2017 | Mi et al. | |
| 9,977,858 B2 | 5/2018 | Solodovnik et al. | |
| 9,985,566 B2 | 5/2018 | Jiang | |
| 10,700,616 B2* | 6/2020 | Ogasawara | H02M 7/48 |

* cited by examiner

*Primary Examiner* — Jeffery S Zweizig
(74) *Attorney, Agent, or Firm* — McGarry Bair PC (57) ABSTRACT

A common-mode voltage cancellation (CMVC) circuit, is disclosed. The circuit includes a first set of coupled inductors, each having a primary winding defining a first polarity, and a secondary winding. The secondary windings are electrically coupled in series. Each primary winding receives a phase voltage having a common mode voltage component from a respective input line. The circuit includes a second set of coupled inductors comprising at least one primary winding and at least one secondary winding The at least one primary winding receives a second voltage from the series connected secondary windings of the first set of coupled inductors. Each at least one secondary winding is coupled in series with a respective input line such that the common mode voltage component received on input lines will be reduced at an output of the set of secondary windings.

20 Claims, 7 Drawing Sheets

METHOD AND APPARATUS FOR COMMON-MODE VOLTAGE CANCELLATION

TECHNICAL FIELD

This disclosure relates to filters for electrical circuits and more specifically relates to a filter circuit for reducing a common-mode voltage in power supplies and particularly for reducing the common-mode voltage provided to an electrical load.

BACKGROUND

High-speed switching devices such as bipolar transistors, metal-oxide-semiconductor field-effect transistors (MOSFETs) and insulated-gate bipolar transistors (IGBTs) have enabled increased switching frequencies for voltage-source pulse width modulated (PWM) inverters and direct current-direct current (DC-DC) converters thus leading to improved operating characteristics. High-speed switching techniques, however, present some drawbacks, as a consequence of the faster rate-of-change in the voltage associated with the high-speed switching.

This associated voltage change produces high-frequency oscillatory common-mode voltage and normal-mode voltage when the switching devices change state, for instance from a conducting state to a non-conducting state, at least in part because of parasitic stray capacitance in the load (e.g., a motor). Accordingly, each time an inverter switching event occurs, the voltage of the corresponding inverter output terminal with respect to ground changes rapidly, and a pulse of common-mode current flows in the direct current (DC) link to the inverter, via the capacitance of the motor cable and motor windings, relative to ground. These common-mode voltages and currents due to switching in power converters and inverters introduces numerous well-known problems in electrical systems.

BRIEF DESCRIPTION

In one aspect, the present disclosure relates to a common-mode voltage cancellation (CMVC) circuit. The CMVC circuit includes a first set of coupled inductors, each coupled inductor of the first set of coupled inductors having a respective primary winding and a respective secondary winding. Each primary winding of the first set of coupled inductors configured to receive a respective first phase voltage having a common mode voltage component from a corresponding input line. The respective secondary windings of the first set of coupled inductors are electrically coupled in series. The CMVC circuit further includes a second set of coupled inductors comprising at least one primary winding in signal communication with the series connected secondary windings of the first set of coupled inductors to receive a second voltage therefrom, the second set of coupled inductors further comprising at least one secondary winding, each at least one secondary winding is coupled in series with a respective input line and to a respective output line, electrically downstream from the respective input line.

In another aspect, the present disclosure relates to a method of cancelling a common-mode voltage in a circuit. The method includes coupling a respective primary winding of a first set of coupled inductors in signal communication with a respective input line to receive a respective first phase voltage having a common-mode voltage component therefrom, wherein each coupled inductor of the first set of coupled inductors comprises a primary winding and a corresponding secondary winding, and coupling the secondary windings of the first set of coupled inductors electrically in series. The method includes coupling at least one primary winding of a second set of coupled inductors in signal communication with the series-coupled secondary windings of the first set of coupled inductors to receive a second voltage therefrom, wherein the second set of coupled inductors comprises at least one secondary winding, and inducing a respective third voltage at the respective secondary windings of the second set of coupled inductors that is out of phase from the second voltage. The method further includes coupling the at least one secondary winding of the second set of coupled inductors in series with a respective input line to receive the respective first phase voltage having the common-mode voltage component therefrom, and coupling the respective secondary windings of the second set of coupled inductors in series with a respective output line to provide a respective fourth voltage thereto.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Aspects of the disclosure can be implemented in any environment, apparatus, or method for reducing a common-mode voltage in a circuit regardless of the function performed by the circuit.

As used herein, the term "set" or a "set" of elements can be any number of elements, including only one. Additionally, as used herein, the term "upstream" refers to a direction that is opposite a fluid or an electron flow direction, and the term "downstream" refers to a direction that is in the same direction as the fluid or electron flow. For example, with respect to a device having an input side and an output side, the term "upstream" refers to a direction toward the input side, and the term "downstream" refers to a direction toward the output side. Additionally, while terms such as "voltage", "current", and "power" can be used herein, it will be evident to one skilled in the art that these terms can be interrelated when describing aspects of the electrical circuit, or circuit operations.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus. Additionally, as used herein, "electrical connection" or "electrically coupled" can include a wired or wireless connection. The exemplary drawings are for purposes of illustration only and the dimensions, positions, order and relative sizes reflected in the drawings attached hereto can vary.

Furthermore, the number of, and placement of, the various components depicted the Figures are also non-limiting examples of aspects associated with the disclosure. For example, while various components have been illustrated with relative position of etc., aspects of the disclosure are not so limited, and the components are not so limited based on their schematic depictions.

Figure 1:
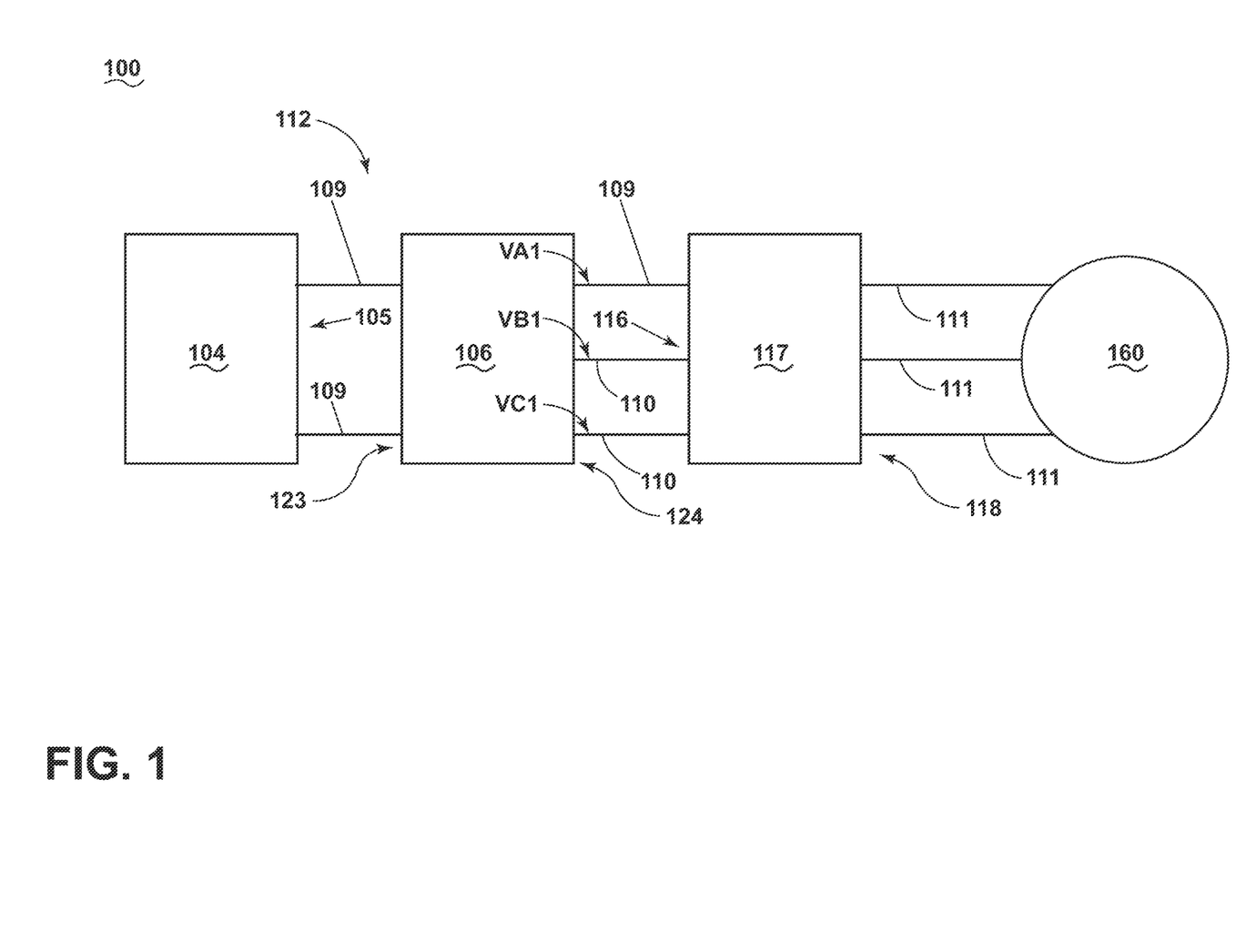
FIG. 1 illustrates schematic view of a power circuit in accordance with various aspects described herein.

With reference to FIG. 1, an aspect of a power distribution circuit 100 is depicted in block diagram form. The power distribution circuit 100 can include at least one power supply 112 electrically coupled to an electrical load 160. The power supply 112 can comprise a power source 104 having an output 105, an inverter 106, having an input 123 and an output 124, and a CMVC circuit 117 having an input 116 and an output 118. The power source 104 output 105 can be connected to the input 123 of the inverter 106 by way of transmission lines 109. The inverter output 124 can be connected to the input 116 of the CMVC circuit 117, via power transmission or input lines 110. The output 118 of the CMVC circuit 117 can be connected with the electrical load 160 via power transmission or output lines 111 such as bus bars, to provide electrical power thereto. In an aspect, the output lines 111 are coupled electrically in series with the input lines 110. In an aspect, the power supply 112 can comprise for example, a conventional DC power source 104, including but not limited to, a battery, photovoltaic panel, DC power supply, any other known source of DC electrical power, or a combination thereof. The DC power from the power source 104 can be provided to the transmission lines 109, which ultimately delivers the electrical power to the electrical load 160, coupled to the power supply 112. In other aspects, the power supply 112 can comprise a conventional alternating current (AC) power source 104, such as a generator, or the like.

In one non-limiting example, the electrical DC output of the power source 104 can be provided via the transmission lines 109, to the input 123 of the inverter 106. The inverter 106 can include any power inverter adapted or configured to invert the DC power received at the input 123 to AC electrical power. The AC electrical power is then provided at the output 124 of the inverter 106 and transmitted therefrom via power transmission input lines 110 to the input 116 of the common-mode voltage cancellation circuit 117. For example, in an aspect, the inverter 106 can provide a 3-phase AC voltage (hereafter, designated first phase voltages VA1, VB1, VC1, respectively) at the output 124 to a respective power transmission input line 110, which in turn can provide the respective phase voltage VA1, VB1, VC1 received from inverter 106 to the CMVC circuit 117. The CMVC circuit 117 input 116 is coupled to the inverter output 124 via power transmission or input lines 110 to receive the 3-phase AC voltage VA1, VB1, VC1, therefrom. In various aspects, each power transmission input line 110 can correspond to a respective AC phase of the inverter output 124.

With continued reference to FIG. 1, schematic aspects of the CMVC circuit 117 will be described in more detail. The CMVC circuit 117 is coupled in signal communication with the inverter 106 and can receive the AC electrical power from the output 124 of inverter 106, at the input 116 of the CMVC circuit 117, via conductors such as the input lines 110. For example, the AC electrical power can be provided as an input to the CMVC circuit 117 as a conventional three-phase AC differential mode voltage (phases denoted VA1, VB1, and VC1), with respect to ground (GND) or neutral, and having any desired frequency.

Each first phase voltage VA1, VB1, VC1 can be provided to the CMVC circuit 117 on separate respective power transmission lines 110. It will be understood that, while the figures depict the CMVC circuit 117 as receiving a conventional three-phase AC voltage VA1, VB1, VC1 from the inverter 106 via three input lines 110 (i.e., one respective input line 110 per phase), aspects of the disclosure are not so limited. It is contemplated that aspects of the CMVC circuit 117 can comprise any desired number of AC or DC voltage inputs, receivable at the input 116, and having any desired number of phase and frequency orientations, on any number of desired power transmission lines 110 without departing from aspects of the disclosure described herein.

It will be understood that the illustrated aspect of the disclosure of FIG. 1 is only one non-limiting example of a power distribution circuit 100, and many other possible aspects, configurations, or the like, in addition to that shown are contemplated by aspects of the present disclosure. It will be understood that while aspects of the disclosure are shown, for ease of understanding, in the simple arrangement shown in FIG. 1, depicting a single power source 104, the disclosure is not so limited and has general application to electrical power systems or power distribution circuits 100 having any number of power sources.

Figure 2:
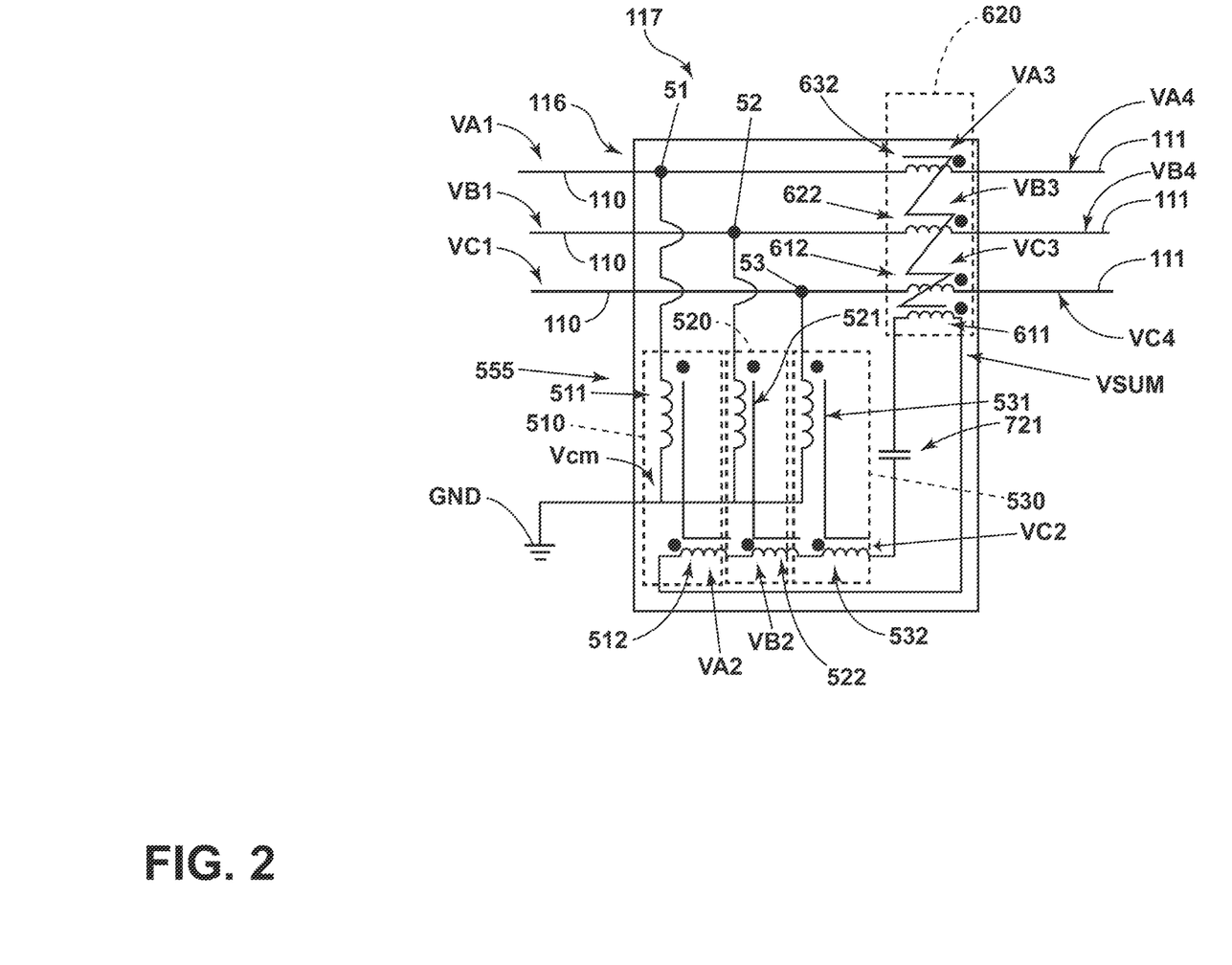
FIG. 2 is a schematic view of a common-mode voltage cancellation circuit in accordance with various aspects described herein.

With reference to FIG. 2, an aspect of the CMVC circuit 117 is depicted in schematic form. The CMVC circuit 117 can comprise a first set of coupled inductors 555 (for example, a first coupled inductor 510, second coupled inductor 520, and third coupled inductor 530), and a second set of coupled inductors 620. In some aspects, the CMVC circuit 117 can optionally include one or more capacitors 721. Each coupled inductor 510, 520, 530 of the first set of coupled inductors 555 includes respective primary windings 511, 521, 531 and corresponding secondary windings 512, 522, 532. In an aspect, the primary windings 511, 521, 531 of the first set of coupled inductors 555 are arranged to define a first polarity, and the corresponding secondary windings 512, 522, 532 are arranged to define second polarity. In an aspect, the first and second respective polarities can be identical. The second set of coupled inductors 620 can be at least partially disposed downstream of the input 116 and proximate to the output 118. In one non-limiting aspect, the second set of coupled inductors 620 can include at least one primary winding 611 and at least one secondary winding, shown as windings 612, 622, 632. In an aspect, the at least one primary winding 611 of the second set of coupled inductors 620 is arranged to define a third polarity, and the corresponding secondary windings 612, 622, 632 are arranged to define a respective fourth polarity. In one non-limiting aspect, the third and fourth polarities are identical. In the aspect shown, the third polarity is opposite the second polarity. Each secondary winding 612, 622, 623 of the second set of coupled inductors 620 can be associated with a respective input line 110 and a respective output line 111. For example, in an aspect, each secondary winding 612, 622, 623 of the second set of coupled inductors 620 can be coupled electrically in series between a respective input line 110 (providing a respective phase voltage VA1, VB1, VC1), and a respective output line 111.

The secondary windings 512, 522, 532 of the first set of coupled inductors 555 are coupled in series with each other, and are further coupled in signal communication (for example, are coupled in parallel) with the at least one primary winding 611 of the second set of coupled inductors 620 to provide a respective voltage thereto.

Aspects of the CMVC circuit 117 receive the respective first phase voltages VA1, VB1, VC1 from the inverter 106 at the CMVC circuit 117 input 116 via the input lines 110. The input lines 110 provide the respective first phase voltages VA1, VB1, VC1 to respective primary windings 511, 521, 531 of the first set of coupled inductors 555. When received by the CMVC circuit 117, the respective first phase voltages VA1, VB1, VC1 provided by the inverter 106 can additionally comprise a common mode voltage component (hereinafter, Vcm).

For example, the input 116 of the CMVC circuit 117 can be conductively connected with the set of first coupled inductors 555. Each respective AC input phase voltage VA1, VB1, VC1, or input line 110 thereof, is connected with a respective coupled inductor 510, 520, 530 of the first set of coupled inductors 555 in signal communication to provide the respective AC phase voltage VA1, VB1, VC1 thereto. For example, as shown, the first voltage phase (VA1) is connected with the first coupled inductor 510, the second voltage phase (VB1) is connected with the first coupled inductor 520, and the third voltage phase (VC1) is connected with the first coupled inductor 530. In an aspect, each primary winding 511, 521, 531 of the first set of coupled inductors 555 can be coupled to a respective input line 110 at a corresponding node, designated 51, 52, 53. As depicted in FIG. 2, primary winding 511 can be coupled to a respective input line 110 associated with phase voltage VA1 at node 51, primary winding 521 can be coupled to a respective input line 110 associated with phase voltage VB1 at node 52, and primary winding 531 can be coupled to a respective input line 110 associated with phase voltage VC1 at node 53. In one non-limiting aspect of the disclosure, each respective primary winding 511, 521, 531 of the first set of coupled inductors 555 is configured to receive a single respective first phase voltage VA1, VB1, VC1 between the input 116 and electrical ground (GND) or neutral. Additionally, or alternatively, in non-limiting aspects of the disclosure, each respective secondary winding 512, 522, 532 of the first set of coupled inductors 555 can be coupled electrically in series.

In an aspect, the respective secondary windings 612, 622, 632 of the second set of coupled inductors 620 can be coupled in series with a respective input line 110 and downstream of a respective node 51, 52, 53. The input lines 110 can thus additionally provide the received first phase voltages VA1, VB1, VC1 to respective secondary winding 612, 622, 632 of the second set of coupled inductors 620.

When provided to the respective primary winding 511, 521, 531 of the first set of coupled inductors 555, the received first phase voltages VA1, VB1, VC1 (including the respective common mode component Vcm) result in an induced second phase voltage VA2, VB2, VC2 at the corresponding secondary windings 512, 522, 532 of the first set of coupled inductors 555. It can be seen that since the secondary windings 512, 522, 532 of the first set of coupled inductors 555 are coupled electrically in series, the induced second phase voltages VA2, VB2, VC2 at the secondary windings 512, 522, 532 are summed (hereinafter, VSUM) and provided to the at least one primary 611 of the second set of coupled inductors 620.

The summed voltage VSUM, when provided to the at least one primary winding 611 of the second set of coupled inductors 620, results in a respective induced third voltage VA3, VB3, VC3 at the corresponding secondary windings 612, 622, 632 of the second set of coupled inductors 620. Additionally, since the secondary windings 612, 622, 632 of the second set of coupled inductors 620 are coupled in series with respective power transmission input lines 110 downstream of nodes 51, 52, 53 to receive respective first phase voltage VA1, VB1, VC1 therefrom, a fourth phase voltage VA4, VB4, VC4 can be defined at the respective secondary windings 612, 622, 632 of the second set of coupled inductors 620 that is a sum of the respective received first phase voltage VA1, VB1, VC1, including the common mode voltage component Vcm, and the respective induced third voltage VA3, VB3, VC3.

It will be understood that an AC voltage applied to a coil (e.g., a coupled inductor primary winding) will induce a voltage in a second coil (e.g., a coupled inductor secondary winding) where the two are linked by a magnetic path (e.g., the coupled inductor core). The phase relationship of the two sinusoidal AC voltages (i.e., the primary and secondary voltages) will depend upon the polarity of the respective windings, and can be arranged to be either in-phase with each other, or displaced by 180 degrees. For example, as described herein, a "first polarity" winding matching with a second "first polarity" winding can be arranged such that the phase relationship of the two sinusoidal AC voltages at the primary and secondary voltages are in-phase with each other. In contrast, as described herein, a "first polarity" winding matching with a second "second polarity" winding can be arranged such that the phase relationship of the two sinusoidal AC voltages at the primary and secondary voltages are out of phase, or displaced by 180 degrees, relative to each other. The magnitude of the induced secondary voltage will depend on the turns or winding ratio of the primary winding to the secondary winding. For ease of understanding and explanation, the aspect depicted in FIG. 2 is described herein as each coupled inductor 510, 520, 530 of the first set of coupled inductors 555 having a primary to secondary winding ratio of 1:1. It will be appreciated that each coupled inductor 510, 520, 530 of the first set of coupled inductors 555 may comprise any desired winding ratio without departing from the scope of the aspects herein.

As noted hereinabove, the secondary windings 512, 522, 532 of the first set of coupled inductors 555 are magnetically coupled to the corresponding primary windings 511, 521, 531 of the first set of coupled inductors 555. It will thus be understood that the mutual inductance of the corresponding primary windings 511, 521, 531 and secondary windings 512, 522, 532 will cause the respective first phase voltages VA1, VB1, VC1 (including the common mode voltage component Vcm) received at the primary winding 511, 521, 531 to be induced on the corresponding secondary windings 512, 522, 532 as the respective second phase voltage VA2, VB2, VC2.

It will be understood that in a conventional three phase AC system, a common mode voltage is typically a voltage difference between the power source and ground or the neutral point of a three-phase load. A common-mode voltage component appears on each line of the multi-line circuit, in-phase and with an amplitude that is an average of the voltages from each line. For example, the common-mode voltage component Vcm of a three-phase AC system having a balanced load, comprising three phase voltages VA1, VB1, VC1 (e.g., the phase to ground voltages, such as, voltage between phase A and ground, etc.) at the output of an inverter with respect to electrical ground, can be expressed as: Vcm=(VA1+VB1+VC1)/3.

With continued reference to FIG. 2, and as noted above, it will be appreciated that because the secondary windings 512, 522, 532 of the first set of coupled inductors 555 are electrically coupled in series, the respective induced second phase voltages VA2, VB2, VC2 (that is, the induced differential mode phase voltages VA2, VB2, VC2) will effectively be added or summed together to define a summed voltage designated VSUM. This can be expressed as the sum of the differential mode phase voltages (i.e., VA2, VB2, VC2) and the common mode voltages (designated VA1cm, VB1cm, VC1cm) for each phase:

$$VSUM = VA2 + VB2 + VC2 + VA1cm + VB1cm + VC1cm$$

However, it will additionally be appreciated that since the three sinusoidal first phase voltages VA2, VB2, VC2 are 120 degrees out of phase with respect to each other, the sum of the three-phase voltage differential mode component VA2, VB2, VC2 will, by definition, equal zero. Thus, the summed voltage VSUM, may be alternatively be expressed as:

$$VSUM = VA2 + VB2 + VC2 + (VA1cm + VB1cm + VC1cm)$$

$$VSUM = 0 + (VA1cm + VB1cm + VC1cm)$$

$$VSUM = 3Vcm$$

The summed voltage VSUM at the secondary windings 512, 522, 532 of the first set of coupled inductors 555 can thus be considered to be in phase with, and having a magnitude that is three times that of the common mode voltage Vcm.

In an aspect, the voltage VSUM can be provided to the at least one primary winding 611 of the second set of coupled inductors 620. The summed AC voltage VSUM provided to the at least one primary winding 611 of the second set of coupled inductors 620 will likewise be transferred (i.e., based on the mutual inductance of the corresponding primary and secondary windings) to the respective secondary windings 612, 622, 632 of the second set of coupled inductors 620 to define an induced respective third phase voltage VA3, VB3, VC3.

As noted above, each at least one primary winding 611 of the second set of coupled inductors defines a third polarity that can be opposite the first and second polarity, and is electrically coupled in signal communication with the series-connected coupled inductor secondaries 512, 522, 532 of the first set of first coupled inductors 555 to receive the summed AC voltage VSUM therefrom.

The magnitude of the induced secondary voltage at the respective secondary windings 612, 622, 632 of the second set of coupled inductors 620 will depend on the turns or winding ratio of the at least one primary winding 611 to the respective secondary winding 612, 622, 632. For ease of understanding and explanation, the aspect depicted in FIG. 2 is described herein with respect to the second set of coupled inductors 620 as having a respective primary to secondary winding ratio of 3:1. In various aspects, the second set of coupled inductors 620 may comprise any desired winding ratio without departing from the scope of the aspects herein.

For example, in some aspects, the turns ratio of the at least one primary winding 611 to the respective secondary windings 612, 622, 632 can be selected based on the number of AC phases in the CMVC circuit 117 when the CMVC circuit 117 is a polyphase AC circuit. In aspects, the turns ratio (i.e. the ratio of the number of primary winding turns to number of secondary winding turns) of the at least one primary 611 to the respective secondary winding 612, 622, 632 can be designated as the ratio T:1, where T is the number of turns of the primary winding 611. In an aspect, the value of T may be selected to equal the number of electrical phases in the CMVC circuit 117. For example, in an aspect comprising a 3-phase AC circuit, the turns ratio of the second set of coupled inductors 620 can be selected to be 3:1. That is, the respective induced third voltage VA3, VB3, VC3 at the respective secondary windings 612, 622, 632 will be 3 times the voltage VSUM at the at least one primary winding 611.

For ease of understanding, as shown in the drawings, a conventional "dot" depicted adjacent to a conventional coupled inductor winding symbol is used to indicate the polarity of a given winding. As will be understood, the term "polarity" refers to the relative direction of the induced voltages between the primary and secondary windings at any given moment in the AC cycle, and the voltage drop from polarity to non-polarity across one winding is essentially in phase with the voltage drop from polarity to non-polarity across the other winding(s). Thus, a positively increasing current in the dotted terminal of one winding induces a positive voltage at the dotted terminal of the other corresponding winding. When so arranged, (i.e., having the same polarity orientation, following left to right on their respective secondary windings 512, 522, 532), the set of first coupled inductors 555 can be considered to have additive polarity. It will be understood that for a coupled inductor having additive polarity, the voltage across the secondary windings of the coupled inductor will be the sum of the voltages at the secondary winding side of the coupled inductor. Conversely, for a coupled inductor having subtractive polarity, the voltage across the secondary windings will be the difference of the voltages at secondary side of the coupled inductor.

Aspects of the disclosure can be included wherein the first set of coupled inductors 555 are arranged to cooperate with the second set of coupled inductors 620 to modify or adjust the respective first, second, and third phase voltages VA1, VB1, VC1, VA2, VB2, VC2, VA3, VB3, VC3 to operatively cancel or reduce the common mode voltage component Vcm from the input phase voltage (e.g. due to the opposite relative polarity of the windings of the first set of coupled inductors 555 relative to the relative polarity of the second set of coupled inductors 620), resulting in the fourth phase voltage VA4, VB4, VC4. That is, the respective fourth phase voltages VA4, VB4, VC4 are equal to the respective first phase voltages VA1, VB1, VC1 with the common mode voltage component Vcm cancelled or subtracted therefrom.

The respective fourth phase voltage VA4, VB4, VC4 can then be provided downstream from the corresponding secondary windings 612, 622, 632 of the second set of coupled inductors 620 for additional filtering (for example by an LC filter 150, not shown) or directly to the electrical load 160, via respective transmission output lines 111.

As noted above, each at least one primary winding 611 of the second set of coupled inductors 620 defines a third polarity opposite the first and second polarity, and is electrically coupled in signal communication with the series-connected coupled inductor secondaries 512, 522, 532 of the first set of first coupled inductors 555 to receive the summed AC voltage VSUM therefrom. Since the second set of coupled inductors 620 is arranged to have a subtractive polarity with respect to the first set of coupled inductors 555, the voltage induced at the secondary windings, 612, 622, 632 of the second set of coupled inductors 620 will be subtractive, or 180 degrees out of phase with the voltage provided to the first set of coupled inductors 555.

For example, with continued reference to FIG. 2, as noted above, the first phase voltages VA1, VB1, VC1 are provided to the to the respective primary windings 511, 521, 531 of the first set of coupled inductors 555 from respective transmission lines 110 and include the common mode voltage component equal to 3Vcm (that is, three times the common mode voltage Vcm), in phase with the first phase voltages VA1, VB1, VC1. The respective first phase voltages VA1, VB1, VC1 (including the common mode voltage component Vcm) are also provided via respective transmission lines 110 to respective secondary winding 612, 622, 632 of the second set of coupled inductors 620.

The induced second phase voltages VA2, VB2, VC2 are summed at the series-connected secondary windings 512, 522, 532 of the first set of coupled inductors 555 resulting in a summed voltage, VSUM, which is essentially equal to 3 times the common mode voltage Vcm=(VA1+VB1+VC1)/3. The summed voltage VSUM is provided to the at least one primary winding 611, thereby resulting in an induced third phase voltage VA3, VB3, VC3 at the respective secondary windings 612, 622, 632 of the second set of coupled inductors 620. The induced third phase voltages VA3, VB3, VC3 will be subtractive, or 180 degrees out of phase with the common mode voltage component Vcm of the corresponding first phase voltages VA1, VB1, VC1. The combination of the respective first phase voltage VA1, VB1, VC1, including and in phase with the common mode voltage component Vcm, with the respective third phase voltage VA3, VB3, VC3, at the respective secondary windings 612, 622, 632 of the second set of coupled inductors 620 operably defines a respective fourth phase voltage VA4, VB4, VC4. Because the respective third phase voltage is equal to but out of phase with the common mode voltage component Vcm, the common mode voltage component Vcm, will operatively be cancelled or reduced. Consequently, the respective fourth phase voltage VA4, VB4, VC4 will be equal to and in phase with the corresponding first phase voltage VA1 VB1, VC1 but with the common mode component subtracted, or cancelled. The "clean" respective fourth phase voltage VA4, VB4, VC4 can then be provided via power transmission or output line 111 to an additional LC filter 150 (not shown), or to the electrical load 160 (not shown).

It will be understood that, while FIG. 2 depicts the CMVC circuit 117 being in signal communication with respective power transmission output lines 111 to provide a respective fourth phase voltage VA4, VB4, VC4 thereto, other aspects are not so limited. It is contemplated that other aspects of the CMVC circuit 117 can comprise any desired number of power output lines 111, having any desired number of phase and frequency orientations, without departing from the scope of the disclosure herein.

In various aspects of the disclosure, other electrical components and devices can be added to the CMVC circuit 117 without departing from the scope of the disclosure. For example, as depicted in FIG. 2, a first set of capacitors 721 can optionally be included in the CMVC circuit 117. The first set of capacitors 721 can comprise any desired number or type of capacitor, including only one. In an aspect, the first set of capacitors 721 comprises a high-pass capacitor. In an aspect the first set of capacitors 721 can be coupled electrically in series between the respective series-coupled secondary windings 512, 522, 523 of the first set of coupled inductors 555 and the at least one primary winding 611 of the second set of coupled inductors 620. In another aspect, the first set of capacitors can be isolated from system ground to reduce a common mode current flow to ground.

Figure 3:
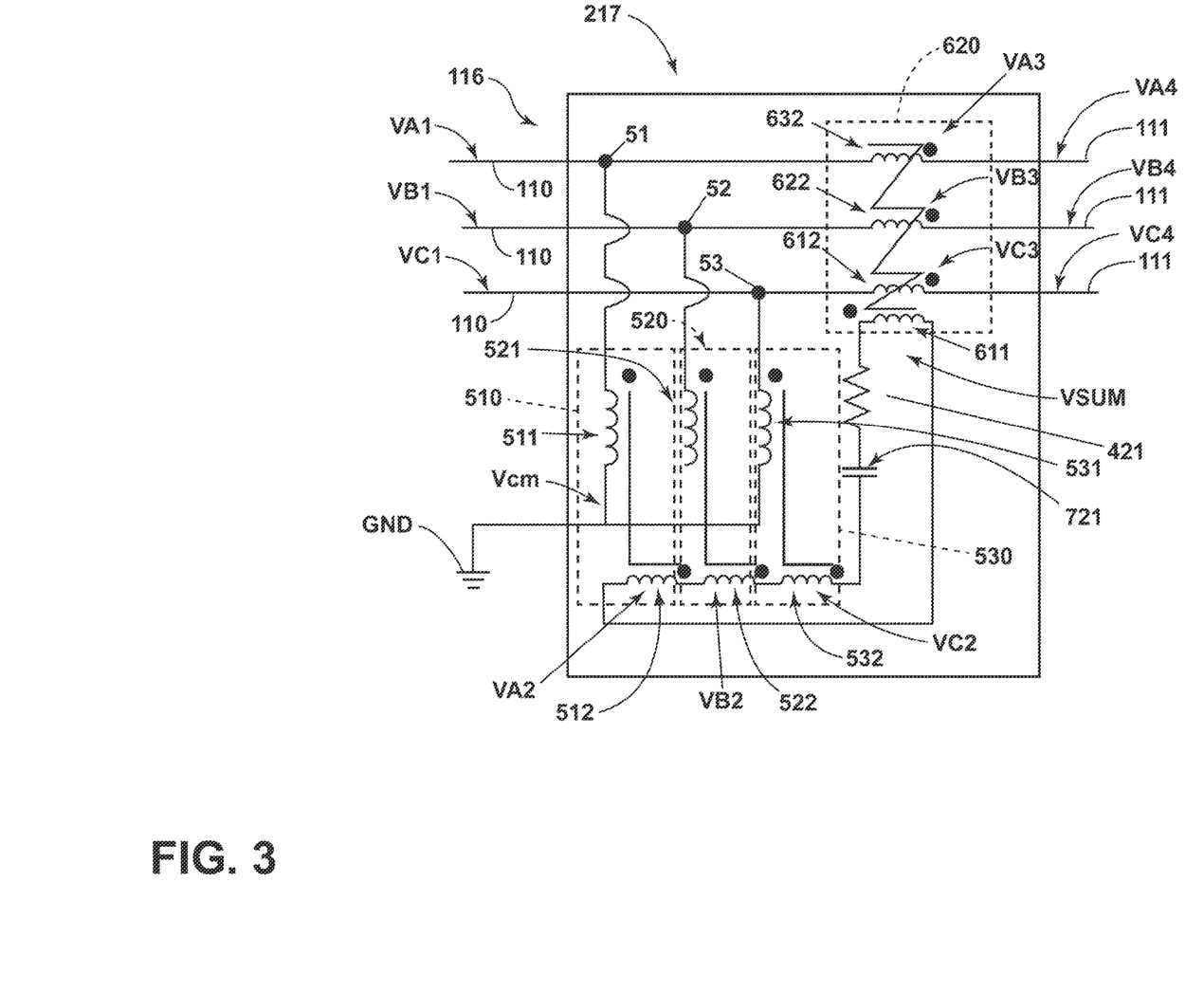
FIG. 3 is a schematic view of another common-mode voltage cancellation circuit, in accordance with various aspects described herein.

It will be appreciated that in various aspects still other additional components can be added to enhance the functionality of the CMVC circuit 117 without departing from the scope of the disclosure herein. For example, aspects can optionally include a resistor 421. With reference to FIG. 3, an alternative aspect of the CMVC circuit 217 is shown in accordance with various aspects described herein. The CMVC circuit 217 is similar to the CMVC circuit 117 illustrated in FIG. 2; therefore, like parts will be identified with like numerals, with it being understood that the description of the like parts of the first example CMVC circuit 117 of FIG. 2 applies to the second example CMVC circuit 217 of FIG. 3, unless otherwise noted. One difference is that aspects of the disclosure included in FIG. 3 can include for example, resistor 421.

Another notable difference is that as indicated by the polarity dot notation of the coupled inductors, the respective polarities of the various coupled inductors of the aspect depicted in FIG. 3 are essentially opposite those as depicted in FIG. 2. However, in both aspects, the relative polarities of the respective primary windings 511, 512, 531 and secondary windings 512, 522, 532 of the first set of coupled inductors 555, and the relative polarities of the respective primary windings 611 and secondary windings 612, 622, 632 of the first set of coupled inductors 620, are arranged with respect to each other such that at high frequencies the common mode voltage Vcm present on the respective input lines 110 will be canceled or reduced at the respective output lines 111.

For example, in some aspects such as depicted in FIG. 2, the first polarity (defined by the primary windings 511, 521, 531 of the first set of coupled inductors 555) and second polarity (defined by the secondary windings 521, 522, 532 of the first set of coupled inductors 555) can be identical relative to each other, and the third polarity (defined by primary windings 611 of the second set of coupled inductors 620) and fourth polarity (defined by the secondary windings 621, 622, 632 of the second set of coupled inductors 620), can be identical to each other, yet the first and second polarities can be opposite the third and fourth polarities. Conversely, in other aspects such as depicted in FIG. 3, the first polarity and second can be opposite relative to each other, and the third polarity and fourth polarity can be opposite relative to each other, yet the second polarity can be identical to the third polarity.

While FIG. 3 depicts a single resistor 420 disposed in series with capacitor 721 can comprise any desired number or type of resistor. In an aspect, the resistor 421 can be used as damping for potential oscillation between the inductors and capacitors in CMVC circuit 117. In an aspect, the optional resistor 421 can be coupled electrically in series between the respective series-coupled secondary windings 512, 522, 523 of the first set of coupled inductors 555 and the at least one primary winding 611 of the second set of coupled inductors 620. In another aspect, the resistor 421 can be coupled electrically in series with the first set of capacitors 721.

With continued reference to FIG. 3, the CMVC circuit 217 can comprise the first set of transformers 555 (for example, the first transformer 510, second transformer 520, and third transformer 530), and a second set of transformers 620. As depicted, the CMVC circuit 217 includes the first capacitor 721 and the resistor 421 coupled in series. Each transformer 510, 520, 530 of the first set of transformers 555 includes respective primary windings 511, 521, 531 and corresponding secondary windings 512, 522, 532. The primary windings 511, 521, 531 of the first set of transformers 555 are arranged to define the first polarity, and the corresponding secondary windings 512, 522, 532 are arranged to define the second polarity. However, in contrast to the aspect of FIG. 2, the first and second respective polarities are shown opposite each other. The second set of transformers 620 can be at least partially disposed downstream of the input 116 and proximate to the output 118. In an aspect, the second set of transformers 620 can include at least one primary winding 611 and at least one secondary winding, shown as windings 612, 622, 632. The at least one primary winding 611 of the second set of transformers 620 is arranged to define the third polarity, and the corresponding secondary windings 612, 622, 632 are arranged to define the respective fourth polarity, and associated with one of each respective output lines 111. As can be seen, the third and fourth polarities are opposite (in contrast to the aspect of FIG. 2). As shown, the third polarity is identical to the second polarity.

As described hereinabove (with respect to the CMVC circuit 117 of FIG. 2), the non-limiting aspect of the CMVC circuit 217 will likewise result in a summed voltage VSUM at the secondary windings 512, 522, 532 of the first set of coupled inductors 555 that can have a magnitude that is three times that of the common mode voltage Vcm.

The voltage VSUM can be provided to the at least one primary winding 611 of the second set of coupled inductors 620. The summed AC voltage VSUM provided to the at least one primary winding 611 of the second set of coupled inductors 620 will likewise be transferred (i.e., based on the mutual inductance of the corresponding primary and secondary windings) to the respective secondary windings 612, 622, 632 of the second set of coupled inductors 620 to define the induced respective third phase voltage VA3, VB3, VC3. As noted above, each at least one primary winding 611 of the second set of coupled inductors defines a third polarity that is identical to the second polarity, and is electrically coupled in signal communication with the series-connected coupled inductor secondaries 512, 522, 532 of the first set of first coupled inductors 555 to receive the summed AC voltage VSUM therefrom.

The magnitude of the induced secondary voltage at the respective secondary windings 612, 622, 632 of the second set of coupled inductors 620 will depend on the turns or winding ratio of the at least one primary winding 611 to the respective secondary winding 612, 622, 632. For ease of understanding and explanation, the aspect depicted in FIG. 3 is described herein with respect to the second set of coupled inductors 620 as having a respective primary to secondary winding ratio of 3:1. In various aspects, the second set of coupled inductors 620 may comprise any desired winding ratio without departing from the scope of the aspects herein.

For example, in some aspects, the turns ratio of the at least one primary winding 611 to the respective secondary windings 612, 622, 632 can be selected based on the number of AC phases in the CMVC circuit 117 when the CMVC circuit 117 is a polyphase AC circuit. In aspects, the turns ratio (i.e. the ratio of the number of primary winding turns to number of secondary winding turns) of the at least one primary 611 to the respective secondary winding 612, 622, 632 can be designated as T: 1, where T is the number of turns of the primary winding 611. In an aspect, the value of T may be selected to equal the number of electrical phases in the CMVC circuit 117. For example, in an aspect comprising a 3-phase AC circuit, the turns ratio of the second set of coupled inductors 620 can be selected to be 3:1. That is, the respective induced third voltage VA3, VB3, VC3 at the respective secondary windings 612, 622, 632 will be 3 times the voltage VSUM at the at least one primary winding 611.

Aspects of the disclosure can be included wherein the first set of coupled inductors 555 are arranged to cooperate with the second set of coupled inductors 620 to modify or adjust the respective first, second, and third phase voltages VA1, VB1, VC1, VA2, VB2, VC2, VA3, VB3, VC3 to operatively cancel or reduce the common mode voltage component Vcm therefrom (e.g. due to the opposite polarity of the windings), resulting in the fourth phase voltage VA4, VB4, VC4. That is, the respective fourth phase voltages VA4, VB4, VC4 are equal to the respective first phase voltages VA1, VB1, VC1 with the common mode voltage component Vcm cancelled or subtracted therefrom. The respective fourth phase voltage VA4, VB4, VC4 can then be provided downstream from the corresponding secondary windings 612, 622, 632 of the second set of coupled inductors 620 for additional filtering (for example by an LC filter 150, not shown) or directly to the electrical load 160, via respective power transmission or output lines 111.

As noted above, in the aspect depicted in FIG. 3, each at least one primary winding 611 of the second set of coupled inductors 620 defines a third polarity opposite the second polarity, and is electrically coupled in signal communication with the series-connected coupled inductor secondaries 512, 522, 532 of the first set of first coupled inductors 555 to receive the summed AC voltage VSUM therefrom. Since the second set of coupled inductors 620 is arranged to have a subtractive polarity with respect to the first set of coupled inductors 555, the voltage induced at the secondary windings, 612, 622, 632 of the second set of coupled inductors 620 will be subtractive, or 180 degrees out of phase with the voltage provided to the first set of coupled inductors 555.

For example, as noted above, the first phase voltages VA1, VB1, VC1 are provided to the to the respective primary windings 511, 521, 531 of the first set of coupled inductors 555 from respective transmission lines 110 and include the common mode voltage component equal to 3Vcm, in phase with the first phase voltages VA1, VB1, VC1. The respective first phase voltages VA1, VB1, VC1 (including the common mode voltage component Vcm) are also provided via respective transmission lines 110 to respective secondary winding 612, 622, 632 of the second set of coupled inductors 620 downstream of nodes 51, 52, 53.

The induced second phase voltages VA2, VB2, VC2 are summed at the series-connected secondary windings 512, 522, 532 of the first set of coupled inductors 555 resulting in a summed voltage, VSUM, which is essentially equal to 3 times the common mode voltage Vcm=(VA1+VB1+VC1)/

3. The summed voltage VSUM is provided to the at least one primary winding 611, thereby resulting in an induced third phase voltage VA3, VB3, VC3 at the respective secondary windings 612, 622, 632 of the second set of coupled inductors 620. The induced third phase voltages VA3, VB3, VC3 will be subtractive, or 180 degrees out of phase with the common mode voltage component Vcm of the corresponding first phase voltages VA1, VB1, VC1. The combination of the respective first phase voltage VA1, VB1, VC1, including and in phase with the common mode voltage component Vcm, with the respective third phase voltage VA3, VB3, VC3, at the respective secondary windings 612, 622, 632 of the second set of coupled inductors 620 operably defines a respective fourth phase voltage VA4, VB4, VC4. Because the respective third phase voltage is equal to but out of phase with the common mode voltage component Vcm, the common mode voltage component Vcm, will operatively be cancelled or reduced. Consequently, the respective fourth phase voltage VA4, VB4, VC4 will be equal to the corresponding first phase voltage VA1 VB1, VC1 but with the common mode component subtracted, or cancelled. The "clean" respective fourth phase voltage VA4, VB4, VC4 can then be provided via output lines 111 to an optional LC filter 150 (not shown), or to the electrical load 160 (not shown).

It will be understood that, while FIG. 3 depicts the CMVC circuit 217 being in signal communication with respective power transmission output lines 111 to provide a respective fourth phase voltage VA4, VB4, VC4 thereto, other aspects are not so limited. It is contemplated that other aspects of the CMVC circuit 217 can comprise any desired number of power output lines 111, having any desired number of phase and frequency orientations, without departing from the scope of the disclosure herein.

Figure 4:
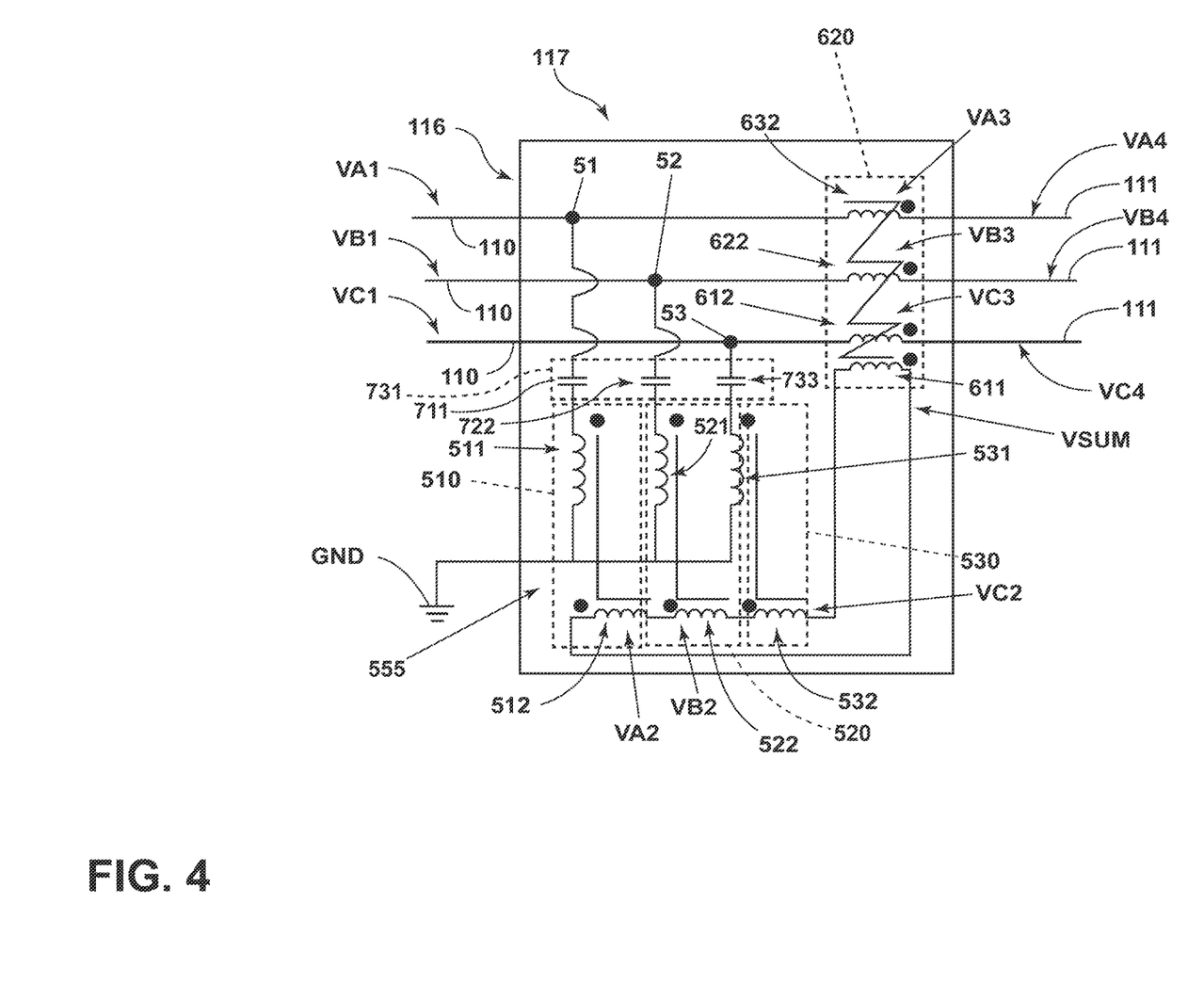
FIG. 4 is a schematic view of yet another common-mode voltage cancellation circuit, in accordance with various aspects described herein.

With reference to FIG. 4, a non-limiting aspect of a CMVC circuit 317 is shown in accordance with various aspects described herein. The CMVC circuit 317 is similar to the CMVC circuit 217 illustrated in FIG. 2; therefore, like parts will be identified with like numerals, with it being understood that the description of the like parts of the first example CMVC circuit 217 of FIG. 2 applies to the second example CMVC circuit 317 of FIG. 4, unless otherwise noted. One difference is that aspects of the disclosure included in FIG. 4 can include for example, a second set of capacitors 731.

For example, as depicted in FIG. 4 the optional second set of capacitors 731 can comprise a respective capacitor 711, 722, 733 coupled electrically in series between the respective primary windings 511, 521, 531 of the first set of coupled inductors and the at respective input lines 110 (e.g. capacitor 711 is coupled between VA1 and the primary winding 511 of coupled inductor 510, capacitor 722 is coupled between VB1 and primary winding 521 of coupled inductor 520, and capacitor 733 is coupled between VC1 and primary winding 531). In an aspect, each capacitor 711, 722, 733 of the second set of capacitors 731 is a high frequency band pass capacitor.

The CMVC circuit 317 can be coupled in signal communication with the inverter 106 (not shown) and can receive the AC electrical power from the output 124 of inverter 106 via power transmission lines 110. For example, in the non-limiting aspect of FIG. 4, the AC electrical power can be provided to the CMVC circuit 317 as a conventional three-phase first AC voltage (VA1, VB1, VC1) having any desired frequency. Each phase voltage VA1, VB1, VC1 can be provided to the CMVC circuit 317 on separate respective input lines 110.

It will be understood that the aspect depicted in FIG. 4 will operate in essentially the same way as the aspect depicted in FIG. 2, with like parts having the same function and arrangement. For example, as depicted in FIG. 4, the respective first phase voltages VA1, VB1, VC1 are provided to respective capacitors 711, 722, 733 of the second set of capacitors 731 (e.g., a respective high frequency band-pass filter capacitor) and to the respective primary windings 511, 521, 531 of the first set of coupled inductors 555. The resultant, induced second phase voltages VA2, VB2, VC2 at the respective secondary windings 512, 522, 523 of the first set of coupled inductors 555 are summed to define a voltage VSUM that is equal to the common mode voltage component Vcm=(VA1+VB1+VC1)/3. The summed voltage VSUM is provided to the at least one primary winding 611 of the second set of coupled inductors 620 thereby resulting in an induced third phase voltage VA3, VB3, VC3 at the respective secondary windings 612, 622, 632 of the second set of coupled inductors 620. The induced third phase voltages VA3, VB3, VC3 will be subtractive or 180 degrees out of phase with the corresponding first phase voltages VA1, VB1, VC1 provided via respective transmission lines 110 to the respective secondary winding 612, 622, 632 of the second set of coupled inductors 620. The combination of the respective first phase voltage VA1, VB1, VC1 with the respective third phase voltage VA3, VB3, VC3, at the respective secondary windings 612, 622, 632 of the second set of coupled inductors 620 operably defines a respective fourth phase voltage VA4, VB4, VC4 that is equal to and in phase with the corresponding first phase voltage VA1 with the common mode component removed or cancelled. The respective fourth phase voltage VA4, VB4, VC4 can then be provided via transmission line 111 to an optional LC filter 150 (not shown), or to the electrical load 160. In this way, the voltage provided to each respective output line 111 by the respective secondary windings 621, 622, 623 of the second set of coupled inductors 620 is equal to the respective first phase voltage VA1, VB1, VC1 with the common mode voltage component reduced therefrom.

It will be understood that, while FIG. 4 depicts the CMVC circuit 317 being in signal communication with respective power transmission lines 111 to provide a respective fourth phase voltage VA4, VB4, VC4 thereto, other embodiments are not so limited. It is contemplated that other embodiments of the CMVC circuit 217 can comprise any desired number of AC voltage outputs, having any desired number of phase and frequency orientations, provided to any number of desired power transmission lines 111 without departing from the scope of the claims herein.

In various aspects of the CMVC circuit, 317, the first and second set of coupled inductors 555, 620 can comprise any respective number of coupled inductors having any desired turns ratio without departing from aspects of the disclosure. Further, in additional or alternative aspects of the disclosure, coupled inductors may be arranged as individual inductors, such as coupled inductors, without departing from aspects of the disclosure . In an aspect, the number of coupled inductors comprising the first or second set coupled inductors 555, 620 can be selected based on the number of phases in the CMVC circuit 317. For example, in an aspect, the number of coupled inductors in the first or second set coupled inductors 555, 620 can be set to N, where N is the number of phases in the CMVC circuit 317.

Figure 5:
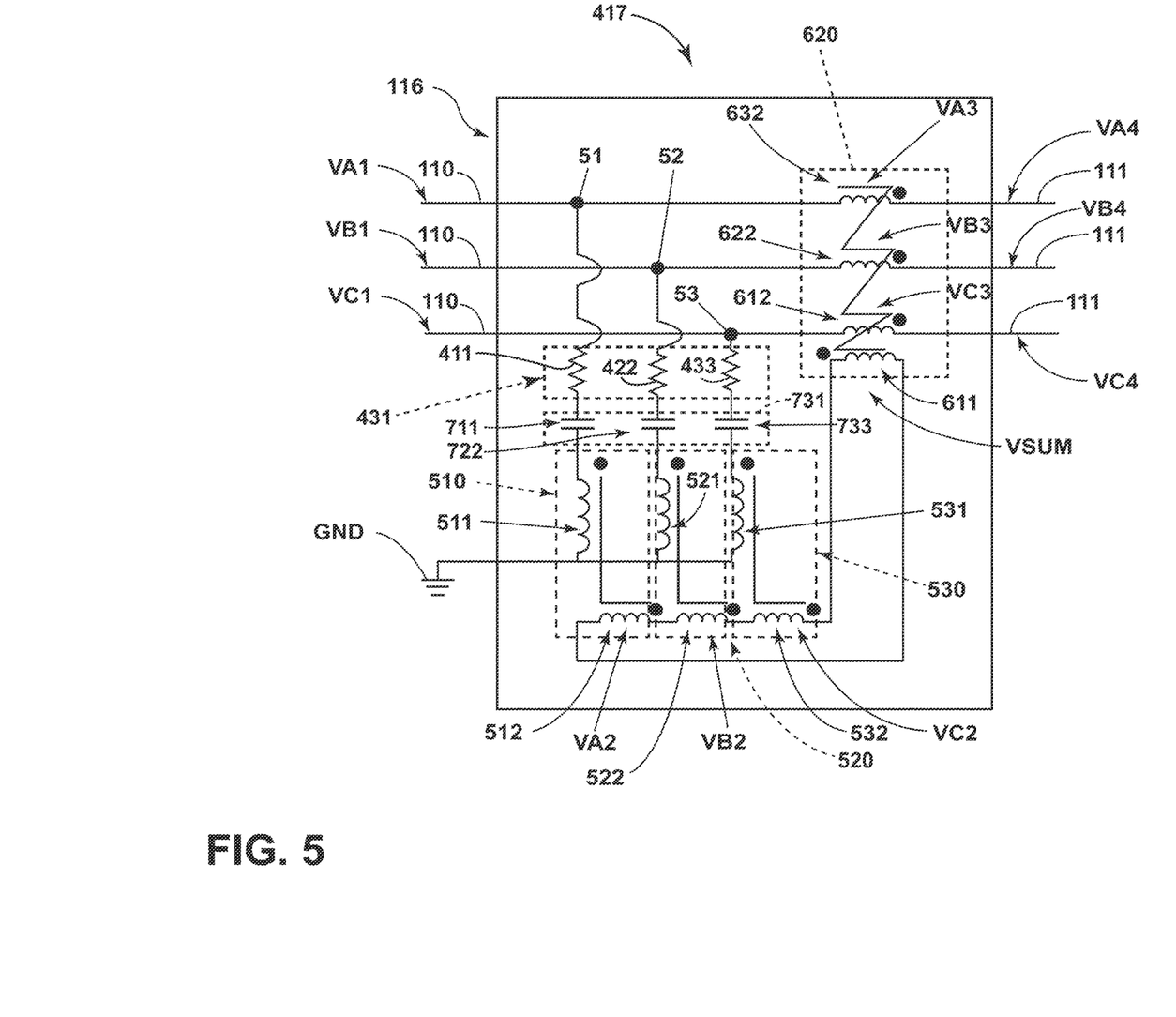
FIG. 5 is a schematic view of still another common-mode voltage cancellation circuit, in accordance with various aspects described herein.

With reference to FIG. 5, an alternative aspect of the CMVC circuit 417 is shown in accordance with various aspects described herein. The CMVC circuit 417 is similar to the CMVC circuit 117 illustrated in FIG. 4; therefore, like parts will be identified with like numerals, with it being understood that the description of the like parts of the first example CMVC circuit 317 of FIG. 4 applies to the second example CMVC circuit 217 of FIG. 3, unless otherwise noted. One difference is that aspects of the disclosure included in FIG. 3 can include for example, a second set of resistors 431.

Another notable difference is that as indicated by the polarity dot notation of the coupled inductors, the respective polarities of the various coupled inductors of the aspect depicted in FIG. 3 are essentially opposite those as depicted in FIG. 2. However, in both aspects, the relative polarities of the respective primary windings 511, 512, 531 and secondary windings 512, 522, 532 of the first set of coupled inductors 555, and the relative polarities of the respective primary windings 611 and secondary windings 612, 622, 632 of the first set of coupled inductors 620, are arranged with respect to each other such that at high frequencies the common mode voltage Vcm present on the respective input lines 110 will be canceled or reduced at the secondary respective output lines 111.

For example, as depicted in FIG. 5 the optional second set of resistors 431 can comprise a respective resistor 411, 422, 433 coupled electrically in series between the respective primary windings 511, 521, 531 of the first set of coupled inductors and the at respective input lines 110 (e.g. resistor 411 is coupled between VA1 and the primary winding 511 of coupled inductor 510, resistor 422 is coupled between VB1 and primary winding 521 of coupled inductor 520, and resistor 433 is coupled between VC1 and primary winding 531). In an aspect, each resistor 411, 422, 433 of the second set of capacitors 731 is a damping resistor.

Figure 6:
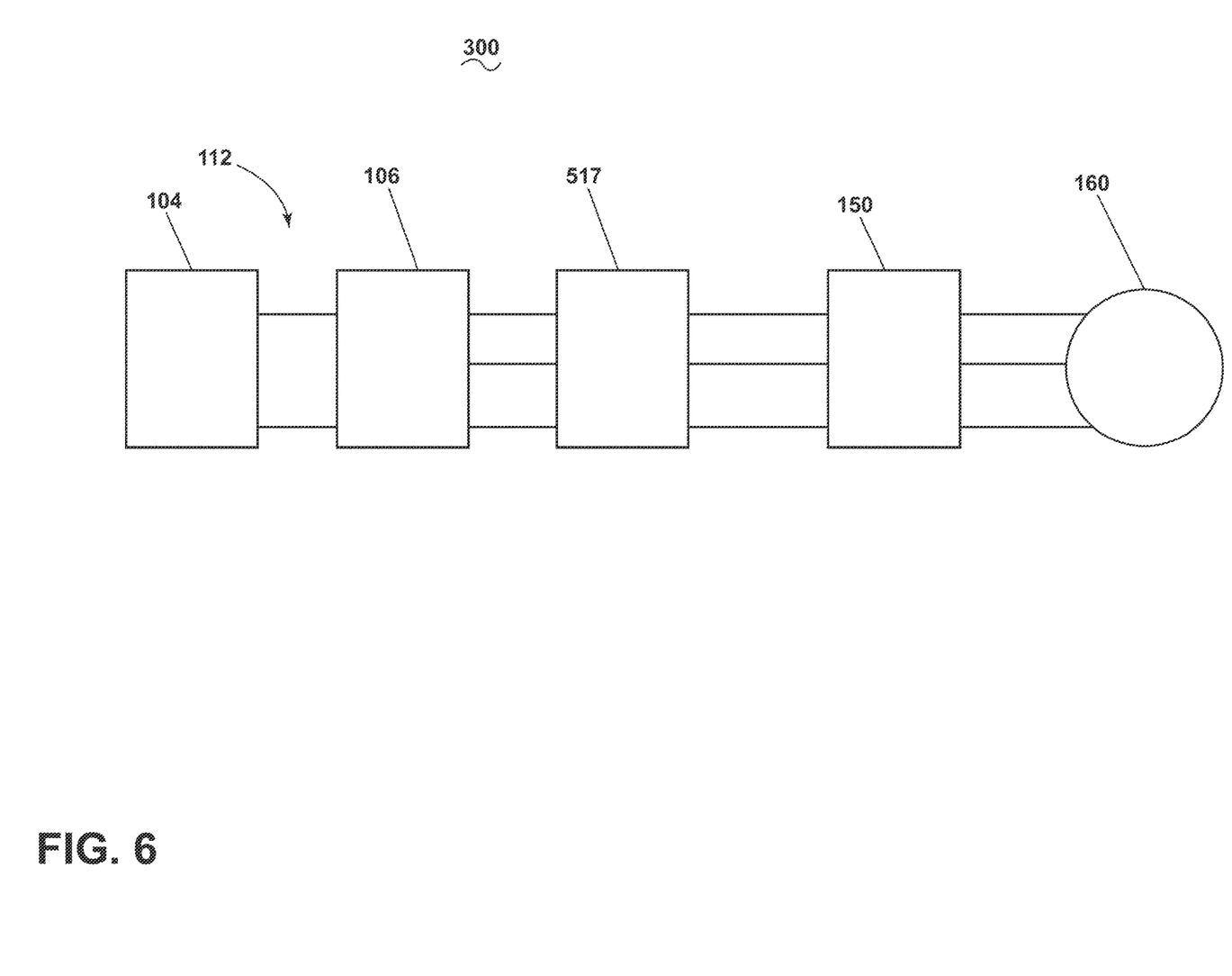
FIG. 6 illustrates schematic view of another power circuit in conjunction with a conventional inductor-capacitor (LC) filter, in accordance with various aspects described herein.

FIG. 6 illustrates another power distribution circuit 300 including a CMVC circuit 517 according to another aspect of the present disclosure. The power distribution circuit 300 is similar to the power distribution circuit 100; therefore, like parts will be identified with like numerals, with it being understood that the description of the like parts of the power distribution circuit 100 applies to the power distribution circuit 300, unless otherwise noted. One difference is that non-limiting aspects of the CMVC circuit 517 can be utilized in conjunction with a conventional common-mode voltage filtering circuit 150. For example, the conventional common-mode voltage filtering circuit 150 can comprise a conventional LC filter. The LC filter 150 can be in signal communication with the CMVC circuit 517, and further arranged to provide an output voltage to the electrical load 160. For example, the LC filter 150 can be coupled electrically in series between the CMVC circuit 517 and the electrical load 160.

Figure 7:
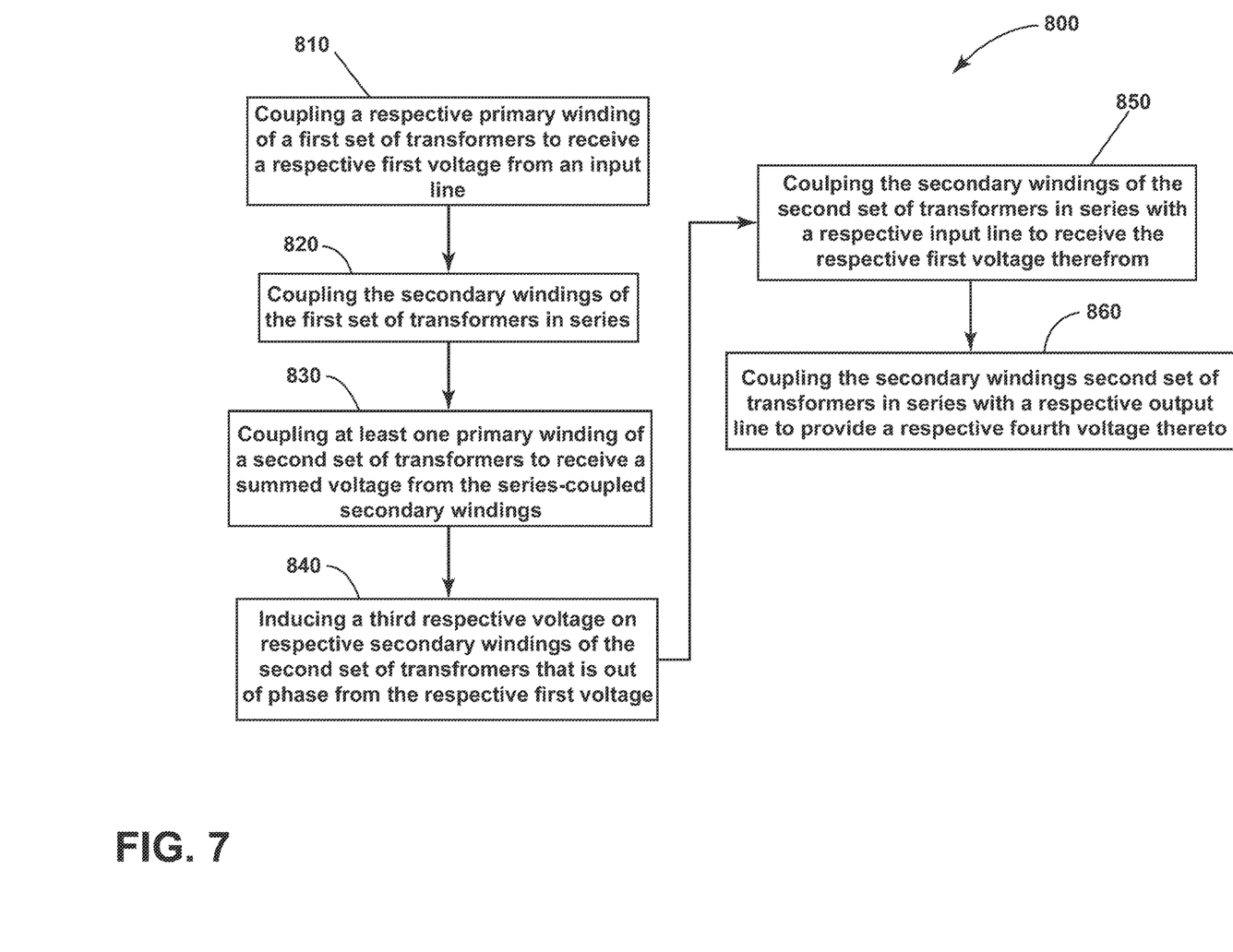
FIG. 7 is a flow diagram of a method of a voltage cancellation in accordance with various aspects described herein.

FIG. 7 illustrates a flow chart demonstrating a method 800 of reducing or cancelling a common-mode voltage by way of utilizing aspects of the CMVC circuits described herein. The method begins by coupling a respective primary winding 511, 521, 521 of a first set of coupled inductors 555 in signal communication with a respective input line 110 to receive a respective first phase voltage VA1, VB1, VC1 having a common mode voltage component therefrom, at 810. Each primary winding 511, 521, 531 of the first set of coupled inductors 555 can define a first polarity. In some aspects, the corresponding secondary winding 512, 522, 532 of the first set of coupled inductors 555 can define a second polarity identical to the first polarity. In other aspects, the second polarity can be opposite the first polarity.

The method includes coupling the secondary windings 612, 622, 632 of the first set of coupled inductors 555 electrically in series, at 820. Next, the method includes coupling at least one primary winding 611 of a second set of coupled inductors 620 in signal communication with the series-coupled secondary windings 512, 522, 532 of the first set of coupled inductors 555 to receive a second summed voltage VSUM therefrom, at 830. The second voltage VSUM can be a sum of the voltages across the series-coupled secondary windings 512, 522, 532 of the first set of coupled inductors 555. In an aspect, the at least one primary winding 611 of the second set of coupled inductors 620 can define a third polarity opposite the second polarity. In another aspect, the at least one primary winding 611 of the second set of coupled inductors 620 can define a third polarity identical to the second polarity. The respective secondary windings 612, 622, 632 of the second set of coupled inductors 620 can define a fourth polarity identical to the third polarity. In other aspects, the respective secondary windings 612, 622, 632 of the second set of coupled inductors 620 can define a fourth polarity identical to the third polarity. The method includes inducing a respective third voltage VA3, VB3, VC3 at respective secondary winding 612, 622, 632 that is out of phase from the respective first voltage VA1, VB1, VC1, at 840. The method includes coupling the respective secondary windings 612, 622, 632 of the second set of coupled inductors 620 in series with a respective input line 110 to receive the respective first phase voltage therefrom, at 850. Next, the method includes coupling the at least one secondary winding 612, 622, 632 of the at least one second coupled inductor 620 in series with a respective output line 111 to provide a respective fourth voltage VA4, VB4, VC4 thereto, at 860. In an aspect, the respective fourth voltage VA4, VB4, VC4 is equal to the first phase voltage VA1, VB1, VC1 with the common mode voltage reduced therefrom.

Other aspects can include coupling a capacitor 721 electrically in series between the series-coupled first coupled inductor secondary windings 512, 522, 532 and the at least one primary winding 611 of the second set of coupled inductors 620. Yet other aspects can comprise coupling a respective capacitor 711, 722, 733 electrically in series between each respective input line and the respective primary winding 511, 521, 521 of the first set of coupled inductors 555.

The sequence depicted is for illustrative purposes only and is not meant to limit the method 800 in any way as it is understood that the portions of the method can proceed in a different logical order, additional or intervening portions can be included, or described portions of the method can be divided into multiple portions, or described portions of the method can be omitted without detracting from the described method.

The aspects disclosed herein provide a common-mode voltage cancellation circuit and method. The technical effect is that the above described aspects enable the cancelling or reduction of the common-mode voltage in a power supply system. One advantage that can be realized in the above aspects is that the above described aspects enable the use of smaller, lighter, and less expensive LC filters compared with conventional systems.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

Further aspects are provided by the subject matter of the following clauses:

A common-mode voltage cancellation (CMVC) circuit, comprising a first set of coupled inductors, each coupled inductor of the first set of coupled inductors having a respective primary winding, and a respective secondary winding, each primary winding of the first set of coupled inductors configured to receive a respective first phase voltage having a common mode voltage component from a corresponding input line, wherein the respective secondary windings of the first set of coupled inductors are electrically coupled in series; and a second set of coupled inductors comprising at least one primary winding in signal communication with the series connected secondary windings of the first set of coupled inductors to receive a second voltage therefrom, the second set of coupled inductors further comprising at least one secondary winding, each at least one secondary winding coupled in series with a respective input line and to a respective output line, electrically downstream from the respective input line.

The CMVC circuit of the preceding clause wherein a relative polarity of the primary and secondary windings of the first set of coupled inductors is opposite a relative polarity of the primary and secondary windings of the second set of coupled inductors.

The CMVC circuit of any preceding clause, wherein the respective first phase voltage having a common mode voltage component is also received by the respective secondary windings of the second set of coupled inductors.

The CMVC circuit any preceding clause, wherein a summed voltage across series connected secondary windings of the first set of coupled inductors is proportional to the common mode voltage component.

The CMVC circuit of any preceding clause, wherein an induced voltage at the respective secondary windings of the second set of coupled inductors is out of phase with the common mode voltage component.

The CMVC circuit of any preceding clause, wherein the voltage across each respective secondary winding of the second set of coupled inductors is proportional to a sum of the respective first phase voltages and the common mode voltage component.

The CMVC circuit of any preceding clause, wherein the voltage provided to each respective output line by the respective secondary windings of the second set of coupled inductors is equal to the respective first phase voltage with the common mode voltage component reduced therefrom.

The CMVC circuit of any preceding clause, wherein the CMVC circuit is a polyphase AC circuit, and wherein the second set of coupled inductors comprises at least N coupled inductors, wherein N is equal to the number of electrical phases in the CMVC circuit.

The CMVC circuit of any preceding clause, further comprising at least one of a capacitor and a resistor electrically coupled in series between the series-connected first coupled inductor secondaries and the at least one primary of the second set of coupled inductors.

The CMVC circuit any preceding clause, further comprising at least one of a set of capacitors and a set of resistors, each respective capacitor and resistor coupled electrically in series with a primary winding of a respective coupled inductor of the first set of coupled inductors.

The CMVC circuit of any preceding clause, wherein each respective output line is in signal communication with an LC filter.

A method of cancelling a common-mode voltage in a circuit, comprising: coupling a respective primary winding of a first set of coupled inductors in signal communication with a respective input line to receive a respective first phase voltage having a common-mode voltage component therefrom, wherein each coupled inductor of the first set of coupled inductors comprises a primary winding and a corresponding secondary winding; coupling the secondary windings of the first set of coupled inductors electrically in series; coupling at least one primary winding of a second set of coupled inductors in signal communication with the series-coupled secondary windings of the first set of coupled inductors to receive a second voltage therefrom, wherein the second set of coupled inductors comprises at least one secondary winding; inducing a respective third voltage at the respective secondary windings of the second set of coupled inductors that is out of phase from the second voltage; coupling the at least one secondary winding of the second set of coupled inductors in series with a respective input line to receive the respective first phase voltage having the common-mode voltage component therefrom; and coupling the respective secondary windings of the second set of coupled inductors in series with a respective output line to provide a respective fourth voltage thereto.

The method of the preceding clause, wherein a relative polarity of the primary and secondary windings of the first set of coupled inductors is opposite a relative polarity of the primary and secondary windings of the second set of coupled inductors.

The method of any preceding clause, wherein the respective first phase voltage having the common-mode voltage component is also received by the respective secondary windings of the second set of coupled inductors.

The method of any preceding clause, wherein a voltage across the series connected secondary windings of the first set of coupled inductors is proportional to the common mode voltage component.

The method of any preceding clause, wherein the induced respective third voltage at the respective secondary windings of the second set of coupled inductors is out of phase with the common mode voltage component.

The method of any preceding clause, wherein the voltage across each respective secondary winding of the second set of coupled inductors comprises a sum of the respective first phase voltage with the common mode voltage component, and the induced voltage at the respective secondary windings of the second set of coupled inductors.

The method of any preceding clause, further comprising, providing to each respective output line a fourth respective voltage that is equal to the respective first phase voltage with the common mode voltage component reduced therefrom.

The method of any preceding clause, further comprising coupling a capacitor electrically in series between the series coupled secondary windings of the first set of coupled inductors and the at least one primary winding of the second set of coupled inductors.

The method of any preceding clause, further comprising coupling a capacitor electrically in series between each respective input line and the respective primary winding of the first set of coupled inductors.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A common-mode voltage cancellation (CMVC) circuit, comprising:
a first set of coupled inductors, each coupled inductor of the first set of coupled inductors having a respective primary winding, and a respective secondary winding, each primary winding of the first set of coupled inductors configured to receive a respective first phase voltage having a common mode voltage component from a corresponding input line, wherein the respective secondary windings of the first set of coupled inductors are electrically coupled in series; and
a second set of coupled inductors comprising at least one primary winding in signal communication with the series connected secondary windings of the first set of coupled inductors to receive a second voltage therefrom, the second set of coupled inductors further comprising at least one secondary winding, each at least one secondary winding coupled in series with a respective input line and to a respective output line, electrically downstream from the respective input line.

2. The CMVC circuit of claim 1 wherein a relative polarity of the primary and secondary windings of the first set of coupled inductors is opposite a relative polarity of the primary and secondary windings of the second set of coupled inductors.

3. The CMVC circuit of claim 2, wherein the respective first phase voltage having a common mode voltage component is also received by the respective secondary windings of the second set of coupled inductors.

4. The CMVC circuit of claim 3, wherein a summed voltage across the series connected secondary windings of the first set of coupled inductors is proportional to the common mode voltage component.

5. The CMVC circuit of claim 4, wherein an induced voltage at the respective secondary windings of the second set of coupled inductors is out of phase with the common mode voltage component.

6. The CMVC circuit of claim 5 wherein the voltage across each respective secondary winding of the second set of coupled inductors is proportional to a sum of the respective first phase voltages and the common mode voltage component.

7. The CMVC circuit of claim 4 wherein the voltage provided to each respective output line by the respective secondary windings of the second set of coupled inductors is equal to the respective first phase voltage with the common mode voltage component reduced therefrom.

8. The CMVC circuit of claim 1, wherein the CMVC circuit is a polyphase AC circuit having a number of electrical phases, and wherein the second set of coupled inductors comprises at least N coupled inductors, wherein N is equal to the number of electrical phases in the CMVC circuit.

9. The CMVC circuit of claim 1, further comprising at least one of a capacitor and a resistor electrically coupled in series between the series-connected first coupled inductor secondaries and the at least one primary of the second set of coupled inductors.

10. The CMVC circuit of claim 1, further comprising at least one of a set of capacitors and a set of resistors, each respective capacitor and resistor coupled electrically in series with a primary winding of a respective coupled inductor of the first set of coupled inductors.

11. The CMVC circuit of claim 1, wherein each respective output line is in signal communication with an LC filter.

12. A method of cancelling a common-mode voltage in a circuit, comprising:
coupling a respective primary winding of a first set of coupled inductors in signal communication with a respective input line to receive a respective first phase voltage having a common-mode voltage component therefrom, wherein each coupled inductor of the first set of coupled inductors comprises a primary winding and a corresponding secondary winding;
coupling the secondary windings of the first set of coupled inductors electrically in series;
coupling at least one primary winding of a second set of coupled inductors in signal communication with the series-coupled secondary windings of the first set of coupled inductors to receive a second voltage therefrom, wherein the second set of coupled inductors comprises at least one secondary winding;
inducing a respective third voltage at the respective secondary windings of the second set of coupled inductors that is out of phase from the second voltage;
coupling the at least one secondary winding of the second set of coupled inductors in series with a respective input line to receive the respective first phase voltage having the common-mode voltage component therefrom; and
coupling the respective secondary windings of the second set of coupled inductors in series with a respective output line to provide a respective fourth voltage thereto.

13. The method of claim 12, wherein a relative polarity of the primary and secondary windings of the first set of coupled inductors is opposite a relative polarity of the primary and secondary windings of the second set of coupled inductors.

14. The method of claim 13, wherein the respective first phase voltage having the common-mode voltage component is also received by the respective secondary windings of the second set of coupled inductors.

15. The method of claim 14, wherein a voltage across the series connected secondary windings of the first set of coupled inductors is proportional to the common mode voltage component.

16. The method of claim 15, wherein the induced respective third voltage at the respective secondary windings of the second set of coupled inductors is out of phase with the common mode voltage component.

17. The method of claim 16, wherein the voltage across each respective secondary winding of the second set of coupled inductors comprises a sum of the respective first phase voltage with the common mode voltage component, and the induced voltage at the respective secondary windings of the second set of coupled inductors.

18. The method of claim 17, further comprising, providing to each respective output line the respective fourth respective voltage that is equal to the respective first phase voltage with the common mode voltage component reduced therefrom.

19. The method of claim 12, further comprising coupling a capacitor electrically in series between the series coupled secondary windings of the first set of coupled inductors and the at least one primary winding of the second set of coupled inductors.

20. The method of claim 12, further comprising coupling a capacitor electrically in series between each respective input line and the respective primary winding of the first set of coupled inductors.

\* \* \* \* \*